United States Patent [19]
Rosano et al.

[11] Patent Number: 5,426,142
[45] Date of Patent: Jun. 20, 1995

[54] SINGLE PACKAGE AMBIENT CURING POLYMERS

[75] Inventors: William J. Rosano, Hatboro; Frederick J. Schindler, Fort Washington, both of Pa.

[73] Assignee: Rohm and Haas Company, Philadelphia, Pa.

[21] Appl. No.: 111,801

[22] Filed: Aug. 25, 1993

[51] Int. Cl.$^6$ .............................................. C08K 5/41
[52] U.S. Cl. .................... 524/156; 524/166; 524/376; 524/378; 524/394; 524/506; 525/102; 427/387
[58] Field of Search ............... 524/156, 166, 376, 378, 524/394, 506; 525/102

[56] References Cited

U.S. PATENT DOCUMENTS

| | | |
|---|---|---|
| 3,328,325 | 6/1967 | Zdanowski . |
| 3,467,610 | 9/1969 | Fiarman et al. . |
| 4,150,005 | 4/1979 | Gehman et al. . |
| 4,626,567 | 12/1986 | Chang . |
| 4,960,924 | 10/1990 | Bors et al. . |
| 4,988,762 | 1/1991 | Overbeek et al. . |
| 5,017,676 | 5/1991 | Cuscurida . |
| 5,124,384 | 6/1992 | Goldstein . |

FOREIGN PATENT DOCUMENTS

| | | |
|---|---|---|
| 0442653 | 8/1991 | European Pat. Off. . |
| 0483583 | 5/1992 | European Pat. Off. . |
| 1185216 | 3/1970 | Germany . |
| 4-189874 | 7/1992 | Japan . |

OTHER PUBLICATIONS

"Comparison of Methods for the Preparation of Acetoacetylated Coating Resins", J. S. Witzeman; W. Dell Nottingham, F. J. Del Rector, Journal of Coatings Technolgy, vol. 62, 1990, 101.

"Feasibility of Using Alkoxy Silane Functional Monomers for the Development of Crosslinking Emulsions", T. R. Bourne, B. G. Bufkin, G. C. Wildman and J. R. Grave, Journal of Coatings Technology, vol. 54, No. 684, Jan. 1982.

*Primary Examiner*—Bernard Lipman
*Attorney, Agent, or Firm*—David T. Banchik

[57] ABSTRACT

The present invention relates to the preparation of aqueous based polymers bearing reactive functional groups. More particularly, this invention relates to waterborne or water dispersed polymers that are equivalent in performance in applications formerly dominated by solvent based polymers.

Polymers of the present invention have many uses including adhesives, saturant applications, solutions or dispersions in water or water-cosolvent mixtures, and are most useful as coatings and sealants for wood, glass, metal, concrete and binders for mortars and non-wovens.

More specifically, surface coatings produced from polymers of the present invention exhibit improved properties such as: for example, durability, toughness, solvent resistance, dirt pickup resistance, print and block resistance and mar resistance.

6 Claims, No Drawings

SINGLE PACKAGE AMBIENT CURING POLYMERS

FIELD OF THE INVENTION

The present invention relates to the preparation of aqueous-based polymers bearing reactive functional groups. More particularly, this invention relates to waterborne or water dispersed polymers that are equivalent in performance in applications formerly dominated by solvent based polymers.

Polymers of the present invention have many uses including adhesives, saturant applications, solutions or dispersions in water or water-cosolvent mixtures, and are most useful as coatings and sealants for wood, glass, metal, concrete and binders for mortars and non-wovens.

More specifically, surface coatings produced from polymers of the present invention exhibit improved properties such as, for example, durability, toughness, solvent resistance, dirt pickup resistance, print and block resistance and mar resistance.

BACKGROUND OF THE INVENTION

In applications where the development of a high degree of durability and toughness under ambient conditions are important, polymers dispersed in organic solvent have traditionally been employed or used. Additionally, solvent based polymers allow the formulator to produce coatings with all the necessary formulation ingredients in a single package. However, more recently, solvent based coatings have come under extreme pressure because of health, safety and environmental concerns. In an attempt to address these concerns, formulators are demanding from raw material suppliers polymers which give equivalent performance with decreasing levels of volatile organic solvents. In response to health, safety and environmental concerns, formulators have increased their use of aqueous based polymers.

However, aqueous based polymers, when cured under ambient conditions, have inherent shortcomings with respect to durability and to toughness when compared to solvent based polymers. Consequently, waterborne coatings have not found wide acceptance in applications where strength and durability are important. Another shortcoming of aqueous based polymers is the need for multiple package systems for equivalent performance of solvent based systems. Multiple package systems require the end-user to mix at least two components prior to the coating application. However, there are instances where the use of multiple package systems are impractical and inconvenient.

What we have found to be novel and unanticipated is a waterborne or water dispersed polymer which cures at ambient temperature and can be formulated into a single package coating, and has the durability and toughness of solvent based polymer systems. This is accomplished by post-reacting an acetoacetoxy functional polymer with an amine-functional silane.

PRIOR RELATED ART

It is well known that incorporation of silane functionality into a polymer can yield compositions which can self-crosslink at about 25° Centigrade. Crosslinking occurs due to the facile hydrolysis of alkoxysilane groups to silanols and their subsequent condensation to form Si-O-Si linkages in the presence of water (See e.g., *Feasibility of Using Alkoxy Silane Functional Monomers for the Development of Crosslinking Emulsions*, T. R. Bourne, B. G. Bufkin, G. C. Wildman and J. R. Grave in the Journal of Coatings Technology, Vol. 54, No. 684, Jan. 1982). However, because of the ease of hydrolysis and subsequent condensation of the silane functionality, it is difficult to produce stable and useful silicone-modified waterborne polymers in a single package. This is particularly problematic for applications where high levels of crosslinking and therefore high levels of silane modification are required.

We have found that many of the problems associated with developing a single package, self-crosslinking waterborne polymer are avoided by the postreaction of an acetoacetoxy functional polymer with an amine functional silane.

Therefore, while it is generally known to modify the properties of polymers by incorporating functional groups, none of the related art discloses the preparation of polymers containing functional acetoacetate groups with post-polymerization reaction of the acetoacetate group with an amine functional silane.

European Patent Application EP 0 442 653 A2 discloses a process for the production of a polymer having desired functional group(s). The functional group(s) can be adhesion promoters, silicones, olefinically unsaturated groups, etc. The desired groups(s) are incorporated into the composition by producing a precursor polymer having —NH— and/or —NH2-bound functionality which is further reacted with a molecule which contains at least one enolic carbonyl capable of forming an enamine with the —NH— or —NH2- functionality, and at least one of the desirable groups. Acetoacetoxy ethyl methacrylate is an example of a species which contains both the enolic carbonyl and a desirable, in this case, an olefinic unsaturation, group. The —NH— and/or —NH2- functional precursor is produced, for example, from the reaction of a carboxylic acid functional polymer and an aziridine-containing species.

European Patent Application EP 0 483 583 A2 discloses a use for an aminosilane as a hardener or an acetoacetate and/or acetoacetamide functional polymer. Cure of this composition results from the hydrolysis and subsequent condensation of the alkoxy silane groups from the presence of water liberated during enamine formation from atmospheric moisture. This is a two package system in that the silane and acetoacetate functional polymer must be mixed or blended just prior to use.

Serial No. 091,489 (Rohm and Haas) discloses the functionalization of a polymer with various desirable groups such as adhesion promoters, steric stabilizers, etc., by reacting an enolic carbonyl containing precursor polymer with a species which contains at least one of the desired functional groups and at least one amine capable of forming an enamine with the enolic carbonyl. However, Serial No. 091,489 does not disclose the use of amino functional silanes.

SUMMARY OF THE INVENTION

The present invention provides a process for the polymerization of polymers containing functional acetoacetate groups and then following the polymerization post-reacting the acetoacetate functional polymer with an amino functional silane to produce self-crosslinking, ambient curing, film-forming polymers.

DETAILED DESCRIPTION

The present invention provides for self-crosslinking, ambient curing, aqueous-based, film-forming polymers containing functional acetoacetate groups which are post-reacted with an amino functional silane.

Coatings produced from polymers of the present invention exhibit improved properties such as solvent resistance, dirt pickup resistance, print and block resistance, mar resistance, adhesion and tensile properties, such as impact resistance, and tensile strength.

Polymers

The preferred polymers for use in this invention are vinyl polymers with pendant acetoacetate groups, alternately known as beta-ketoesters. The term "pendant" is used in the specification to mean "attached to the polymer backbone and available for further reaction." Pendant should not be read in the strict sense which would exclude the attachment of such groups at the termini of a polymer chain. Thus, polymer having acetoacetate functionality introduced on the chain end by an acetoacetate functional mercaptan, as taught in U.S. Pat. No. 4,960,924, would be useful in this invention. Generally, the pendant acetoacetate groups are attached to the polymer backbone via an organic divalent radical $R^1$ which in turn is attached to the acetoacetate moiety or by a trivalent organic radical $R^2$ bearing two acetoacetate groups.

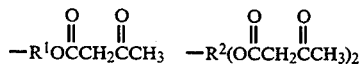

The acetoacetate functional polymers can be prepared by means known in the art. A preferred method is polymerization through incorporation, which includes an acetoacetate functional monomer. A preferred monomer is acetoacetoxyethyl methacrylate which is conveniently referred to throughout this specification as AAEM, shown below.

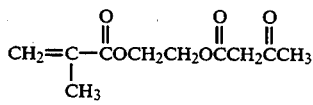

Examples of other monomers useful for introduction of acetoacetate functionality are acetoacetoxyethyl acrylate, acetoacetoxypropyl methacrylate, allyl acetoacetate, acetoacetoxybutyl methacrylate, 2,3-di(acetoacetoxy)propyl methacrylate, and the like. In general, any polymerizable hydroxy functional monomer can be converted to the corresponding acetoacetate by reaction with diketene or other suitable acetoacetylating agent (See e.g. *Comparison of Methods for the Preparation of Acetoacetylated Coating Resins*, Witzeman, J. S.; Dell Nottingham, W.; Del Rector, F. J. Coatings Technology; Vol. 62, 1990, 101. (and references contained therein)).

The vinyl polymers of this invention are most often copolymers of the acetoacetate functional monomer and other monomers. Examples of useful comonomers are simple olefins such as ethylene, alkyl acrylates and methacrylates where the alkyl group has 1 to 20 carbon atoms (more preferably 1 to 8 carbon atoms), vinyl acetate, acrylic acid, methacrylic acid, acrylonitrile, styrene, isobornyl methacrylate, acrylamide, hydroxyethyl acrylate and methacrylate, hydroxypropyl methacrylate and acrylate, N-vinyl pyrolidinone, butadiene, isoprene, vinyl halides such as vinyl chloride and vinylidene chloride, alkyl maleates, alkyl fumarates, fumaric acid, maleic acid, itaconic acid, and the like. It is also possible, and sometimes desirable, to include low levels of divinyl or polyvinyl monomers such as glycol polyacrylates, allyl methacrylate, divinyl benzene, and the like, to introduce a controlled amount of gel in the latex particle. It is important, however, to be sure that when this is done, the quality of the film formation is not seriously impaired. Additionally, one may wish to include chain transfer agents to control molecular weight of the polymer.

The acetoacetate functional polymer may contain from about 0.5 percent to 100 percent of the acetoacetate functional monomer by weight. In any application, the amount of acetoacetate functional monomer required will vary from case to case depending upon the desired degree of post functionalization necessary for the particular end-use application. Generally, however, the acetoacetate monomer concentration will be between 1 percent and 40 percent. Conventional coatings will usually contain from about 0.5 percent to 20 percent acetoacetate monomer by weight. Polymers having a molecular weight of from 1,000 to over one million can be used. The lower molecular weight polymers should contain a sufficiently high level of acetoacetate to maximize the degree of post functionalization. For example, a copolymer of AAEM having a molecular weight under 10,000 would typically contain 30 percent or more of AAEM.

Generally, the vinyl polymer is prepared as a dispersion or emulsion polymer in water by a suitable free radical initiated polymerization technique, using a free radical initiator and appropriate heating. Since a film-forming polymer is sometimes desired, useful emulsion polymers will generally have glass transition temperatures under 60 degrees Centigrade, since these polymers with coalescent will form good quality films at ambient temperatures. If soluble polymers are used in the film-formation process, polymers of higher glass transition temperature are readily used since they are film-forming.

In certain aspects of the invention, polymerization in an aqueous medium and, in particular, aqueous emulsion polymerization, is used to prepare the polymer. Conventional dispersants can-be used (e.g. anionic and/or nonionic emulsifiers such as alkali or ammonium alkyl sulfates, alkyl sulfonic acids, and fatty acids, oxyethylated alkyl phenyls, and the like). The amount of dispersant used is usually 0.1 percent to 6 percent by weight based on the weight of total monomer. Either thermal or redox initiation processes may be used. Conventional free radical initiators may be used (hydrogen peroxide, organic hydroperoxides such as t-butyl hydroperoxide, cumene hydroperoxide, t-amyl hydroperoxide, ammonium and/or alkali persulfates, organic peroxides such as t-butyl perpivalate, t-butyl perbenzoate, benzoyl peroxide, di(n-propyl) peroxydicarbonate, acetyl cyclohexylsulfonyl peroxide, and the like); typically 0.05 percent to 3.0 percent by weight based on the weight of total monomer. Redox systems using the same initiators coupled with a suitable reductant (for example: reducing sugars such as isoascorbic acid, sodium bisulfite, sodium thiosulfate, hydroxyl amine, hydrazine, sodium hydrosulfite) can be used at similar levels, oftentimes in conjunction with a metal catalyst such as salts of transition metals, examples of which are iron sulfate, copper sulfate, vanadium sulfate, and the like. Additionally, non-oxidizing thermal initiators such as 2,2'-Azo-bis-isobutyronitrile, 4,4'-Azo-bis(4-cyanopentanoic acid), 2,2'-Azo-bis(2-amidinopropane) dihydrochloride, and the like. Frequently, a low level of chain transfer agent such as a mercaptan (for example: n-octyl mercaptan, n-dodecyl mercaptan, butyl or methyl mercaptopropionate, mercaptopropionic acid at 0.05 percent to 6 percent by weight based on total weight of monomer) is employed to control molecular weight.

The invention may also be practiced using a solvent-soluble or water-soluble polymer. When this is desired, the polymer may be prepared directly in water if the monomer mix is water-soluble or, as is most often the case, the polymerization solvent is a water miscible solvent such as isopropanol, butyl cellosolve, propylene glycol, and the like. In this case, water may be included in the polymerization mixture or post added after the polymerization is complete. In some cases, the polymer is prepared in a conventional organic solvent such as xylene, butyl acetate, methyl ethyl ketone, methyl tertiary butyl ether, and the like. When organic solvent is employed with or without water, it is convenient to use organic soluble-free radical initiators such as azo-bis-isobutyronitrile, t-butyl-peroctoate, or benzoyl peroxide and whatever heat is convenient to assure smooth copolymerization. Another route to preparation of a water-soluble polymer for this invention is to prepare a vinyl dispersion polymer having enough acrylic or methacrylic acid or other polymerizable acid monomer (usually greater than 10 percent) so that the emulsion polymer can be solubilized by addition of ammonia or other base. Watersoluble polymers of this type are advantageously used as blends with conventional dispersion polymers, preferably those which also have pendant acetoacetate functionality. The blend of alkali-soluble resin and latex polymer has a particularly advantageous property combination of gloss and rheology and is useful in coatings and printing ink applications.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such dispersions are well known in the art. It is sometimes advantageous to introduce some crosslinking or gel structure by the sequential polymerization process in the core via low levels of a crosslinking monomer such as allyl methacrylate, diallylphthalate, diallyl maleate, butylene glycol dimethacrylate, divinyl benzene, triallyl isocyanurate, ethylene glycol diacrylate, and the like. The lightly crosslinked core does not adversely affect film formation and does in some cases result in better coatings, particularly when tile pendant acetoacetate is concentrated in the shell.

As indicated above, a major use for this technology is for functionalizing vinyl polymers dispersed or dissolved in aqueous solvents. Unfortunately, vinyl polymers containing pendant acetoacetate are prone to hydrolysis in water, particularly on heat aging. The hydrolysis occurs at nearly any pH and yields acetoacetic acid,

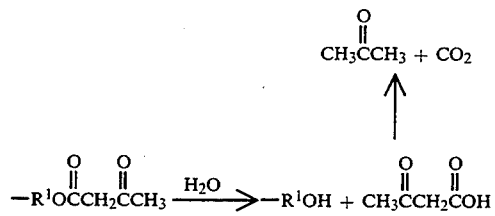

which in turn decomposes to acetone and carbon dioxide.

In an earlier application, U.S. Ser. No. 632,302, the solution to this problem was provided by treating the aqueous acetoacetate polymer after preparation with one molar equivalent of ammonia or a primary amine such as ethanolamine, methyl amine, or isopropyl amine. As described in that application, typically, the polymer is neutralized to a basic pH with one of the aforementioned amines, preferably to a pH greater than 9. Under these conditions, the enamine is formed. The reaction to form the enamine is generally rapid with the rate of formation increasing with temperature. In general, enamine formation is complete within 8 hours. An alternative approach is to raise the pH to about 9, allow the system to equilibrate, and readjust the pH to about 9 to replace the amine consumed by enamine formation. The enamine is stable to hydrolysis at pH's typically greater than 7.

Another approach to preparation of vinyl polymers containing equivalent pendant enamine functionally is to use preformed enamine monomers derived from the appropriate amine and the acetoacetate monomer. In this case, the pH must be kept on the alkaline side during polymerization to avoid hydrolysis of the enamine back to the acetoacetate.

Amino Functional Silanes

Aminosilane-modified polymers of this invention are prepared by adding an effective amount of an aminosilane to a polymer having acetoacetate functionality introduced on the polymer chain by an acetoacetate functional monomer such as, for example, acetoacetoxy ethyl methacrylate. The quantity of aminosilane that is added to the polymer is a function of the acetoacetate functionality content of the polymer. As mentioned above, the level of acetoacetoxy functional monomer is generally from about 1 weight percent to about 40 weight percent, based on the weight of the polymer. The level of aminosilane to modify the polymer is from about 0.10 to about 1.0 moles of amine moiety to one mole of acetoacetoxy group.

If insufficient aminosilane is used in relation to the acetoacetate functional vinyl polymer, properties, such as, for example, solvent resistance, dirt pickup resistance, print and block resistance, and mar resistance of the dried coating may be compromised. Whereas, on the other hand, if the ratio of the moles of aminosilane to the moles of acetoacetate functionality is much greater than 1 of the vinyl polymer, coating properties such as film formation may become imparted do to excessive precrosslinking of the silicone groups. This may also lead to increased water sensitivity as well as discoloration of some substrates such as, for example, wooden substrates.

Aminosilanes of various molecular weights and structures may be used to modify the acetoacetate function polymer in practicing the invention. The general structure of the aminosilanes useful for the invention is

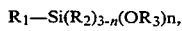

$$R_1\text{—}Si(R_2)_{3-n}(OR_3)_n,$$

where n is the greater or equal to 1 but less than or equal to 3, $R_1$ is an alkyl or phenyl group or combinations thereof and contains at least one amine group capable of forming an enamine with the acetoacetoxy group, $R_3$ is alkyl, phenyl or hydrogen atom or combinations thereof, and $R_2$ is a hydrogen atom phenyl or alkyl group or combinations thereof. The group $R_2$ may also be oligomers of silane, which may or may not contain $OR_3$ groups and may or may not include amine functionality capable of undergoing enamine formation with acetoacetoxy groups. Preferably, however, the aminosilanes have an average molecular weight, as may be determined by gel permeation chromatography, of from about 140 to about 500, most preferably from about 150 to about 250. Practical considerations such as solubility, hydrolysis rate, compatibility with the acetoacetate precursor polymer, polymer stability, and the like, are the only limitations placed upon the structure and molecular weight of the aminosilane. Although for convenience purposes, it is most preferred that the molecular weight not exceed a maximum of about 190 to about 250, that n is equal to 1 or 2, that $R_2$ is a methyloxy or ethyloxy group and that $R_1$ is an alkyl group of 3 to 6 carbon atoms and contains no more than one amine group capable of forming an enamine with the acetoacetoxy group.

Amino silanes found to be effective modifiers of acetoacetate functional vinyl polymer polymers may be selected from the group consisting of trimethoxysilylpropyldiethylenetriamine, N-methylaminopropyltrimethoxysilane aminoethylaminopropylmethyldimethoxysilane, aminoethylaminopropyltrimethoxysilane (Dow Corning Z-6020), aminopropylmethyldimethoxysilane, aminopropyltrimethoxysilane, polymeric aminoalkylsilicone, aminoethylaminoethylaminopropyl-trimethoxysilane, N-methylaminopropyltrimethoxysilane, methylamino-propyltrimethoxysilane, aminopropylmethyldimethoxysilane, aminopropyltriethoxysilane, 4-aminobutyltriethoxysilane, oligomeric aminoalkylsilane and the like, which are available from Dow Corning, Midland, Mich., Union Carbide Specialty Chemicals Division, Danbury Connecticut and Huls of America, Piscataway, N.J., Wacker Silicones Corporation of Adrian, Mich.

In the practice of the invention, aminosilane-modified coatings are prepared by adding a specific quantity of aminosilane to acetoacetate functional vinyl polymer. The quantity of silane added should be in specific proportion, for reasons stated earlier, to the acetoacetate content of the polymer. The amino-functional silane is preferably added after the polymerization of the acetoacetate functional vinyl emulsion polymer.

In general, the aminosilane can be added directly to the acetoacetate functional precursor polymer. However, for optimum performance and processing of the final silicone-modified polymer, an auxiliary surfactant may be required. This is particularly true, for example, in some cases where the precursor polymer is produced by emulsion polymerization in this case, the surfactant can provide, for example, enhanced stability, as well as enhanced desirable properties such as mar resistance when used in conjunction with aminosilane.

The auxiliary surfactant can be added preferably before or after the addition of the aminosilane, or as part of the preparation of the precursor, as in the case, for example, of emulsion polymerization.

Surfactants may be characterized by their "Hydrophilic-Lipophilic Balance" (HLB) value. Surfactants with HLB values of less than 10 are considered to possess more lipophilic character, while surfactants with HLB values greater than 10 are considered to possess more hydrophilic character. In the context of the preferred surfactants, non-ionic surfactants with HLB values with more hydrophilic character, HLB>(greater than) 10 are desirable. More preferably, the HLB value should be greater than 15.

Surfactant levels of up to 10 percent of the weight of the precursor can be used. The more preferable level of surfactant is between 3 percent and 6 percent of the weight of the precursor. The only limitations on the surfactant level are, for example, poor water resistance, instability, and the like.

Examples of surfactants which may be used in the practice of the present invention are selected from the group consisting of non-ionics, such as octylphenoxypolyethoxyethanols, nonylphenoxypolyethoxyethanols, polypropyloxyethoxy alcohols, and the like, and ionics, such as sodium lauryl sulfate, sodium stearate, and the like.

Additives

The acetoacetate functional vinyl polymer-modified with aminosilanes of this invention may be formulated for the chosen end use. Additives such as thickeners, dispersants, pigment, extenders, fillers, anti-freeze agents, plasticizers, adhesion promoters, coalescents, wetting agents, defoamers, colorants, nona-aldehyde based biocides, soaps and slip agents may be incorporated.

TEST METHODS

Evaluating the Performance of Clear Coatings Based on Silicon-Modified Lattices

Mar Resistance

This test is based on striking the coating at a shallow angle with a hard object; in the examples provided, the object was the fingernail of the individual performing the test. This test gives an indication of how the coating will resist marring, which leads to gloss reduction of the coating.

After the coating is applied to the substrate and allowed to cure, the coated substrate is placed on a solid surface such as a table top and struck with the operator's fingernail. The operator's fingernail is kept parallel to the coated surface and the impact angle is greater than 45° from the normal of the surface, to increase the likelihood of marking the coating.

When comparing coatings, it is important that the same operator perform the test. This test is designed to distinguish relative differences.

We used the following rating system:

| Rating | Appearance |
| --- | --- |
| 1-Excellent | No perceptible marks |
| 3-Good | Marks which appear as thin scratches |
| 5-Poor | Marks which are wide |

Black Heel Mark and Scuff Resistance

The method for determining black heel and scuff resistance is described in *Chemical Specialty Manufacturers Association Bulletin* No. 9-73, except commercially available rubber shoe heels were used in place of the recommended 2″ rubber cubes and the substrates were wood (maple) panels rather than vinyl tile.

We determined the percentage of the coated substrate area which was covered by black heel and scuff marks; this is conveniently performed with transparent graph paper. Black heel marks are an actual deposition of rubber onto or into the coating. Black heel marks can be temporary and may be removed with dry cheesecloth, for example, or with cheesecloth and an appropriate solvent such as odorless mineral spirits.

A scuff mark, on the other hand, results from a physical displacement of the coating and appears as an area of reduced gloss. Scuff and black heel marks can occur simultaneously at the point where the heel impacts the substrate; i.e., upon removal of a black heel mark, a scuff may be present.

Floor Wear Test

Coatings were applied to wood panels, and cured at 25° centigrade for a specific time prior to their placement in a heavily traveled corridor. The corridor used experienced foot traffic as well as wheeled traffic from maintenance carts, sample trays etc. The gloss at 60 and 20 degrees as well as scuffing and scratching before and after a sufficient exposure time were measured.

Black Mark Removal with a Dry Cloth

After the test panels were exposed to rubber heels as described above, the coatings were tested for ease of rubber mark removal with a dry cloth. Cheesecloth was rubbed over the black rubber marks with moderate pressure after which removal was rated as "complete" meaning all black rubber marks were removed; "partial" meaning less than all of the black rubber marks were removed; and "none" meaning all of the black rubber marks were present after wiping.

The following examples are provided to illustrate some embodiments of the invention. They should not be read as limiting the scope of the invention which is more fully described in the specification and claims.

Unless otherwise indicated, percentages are by weight based on the total solids.

EXAMPLES

Example I

Example I shows the enhancement of coating performance aminosilane modification brings to the AAEM containing latex. We also show the effect of aminosilane level and aminosilane type on coating performance.

Preparation of Precursor Latex

The details for the preparation of the precursor lattices I-A and I-B are described below. Both Precursors are identical in their preparation except the monomer acetoacetoxy ethyl methacrylate (AAEM) was omitted from I-B. Table I-A shows the composition of the precursors as well as some characteristics.

To a glass vessel add 121.3 g deionized water (DIW) and 6.1 g of ALIPAL CO436. To this 4.8 g of sodium lauryl sulphate followed by 326.3 g butyl acrylate (BA), 386.8 g methyl methacrylate (MMA), 7.25 allyl methacrylate (ALMA) and 3.65 g methacrylic acid was added and then stirred to emulsify. This is monomer emulsion 1 (ME-1).

To another glass vessel 260 g DIW and 14.2 g of ALIPAL CO436 was added. To this 380.9 g BA, 515 g MMA, 167.8 g AAEM and 27.5 g of MAA was added and then stirred to emulsify. This is monomer emulsion 2 (ME-2).

To a polymerization Vessel 1282.3 g DIW was charged under dry nitrogen followed by 18.6 g of ALIPAL CO436. This mixture was stirred and then heated to 85° C. Next, 100 g of ME-1 was added. Two minutes later, 3.6 g of sodium persulphate (SP) in DIW was added. After ten minutes, 7.2 g of sodium carbonate in DIW was added. Five minutes later, ME-1 was cofed with 0.90 g of SP in DIW over 90 minutes. After the addition of ME-1 was complete, the ME-1 vessel was rinsed with 40 g of DIW. The polymerization vessel was held at 85° C. for an additional 15 minutes. Next, the cofed of ME-2 was started with 0.90 g SP in DIW. This cofeed was carried over a 90 minute period. Following the addition of ME-2, the ME-2 vessel was rinsed with 40 g DIW. The polymerization vessel was held for 30 minutes at 85° C.

After the 30 minute hold at 85° C., the vessel was cooled to 55° C. and the monomers were "chased" by, in the order, 5 g of 0.15% FeSO4, 5 g of 1% versene and 0.5 g of 70% t-BHP all in DIW. After one minute, 0.30 g of isoascorbic acid in DIW was added. After an additional 30 minute hold at 55° C., 62.5 g of 28% aqueous ammonia was added. The resulting polymer was cooled to room temperature before modification with the aminosilane.

Precursors I-A and I-B are identical in their preparation, two-stage process, and composition except AAEM was omitted from I-B.

Preparation of Silicon-Modified Latex

Into a mixing vessel, precursor I-A, whose preparation is described above, was charged. With stirring, TRITON X405 (70%) was added to the stirring precursor over the course of about 5 minutes. Approximately 10 minutes after the X405 addition, the aminosilane was added drop-wise over the course of about 5 minutes. The mixture was allowed to stir for about one hour after the addition of the aminosilane was complete. The amounts of materials used are shown in Table I-2. The silane-modified latex was allowed to stand for about 16 hours before it was formulated into a sealer.

Preparation of Aqueous Wood Sealers Based on Silane-Modified Lattices

Table I-3 gives the sealer formulation used to evaluate compositions I-1 through I-9. A general formulation is shown as well as a specific example based on composition I4. To a mixing vessel, all materials except the latex were added. With stirring, the silane-modified latex was added and stirred for at least an additional hour and allowed to stand for at least 16 hours before use.

Testing of Sealers Based on Compositions I-1 to I-9

To maple wood panels, 3 coats of sealers based on compositions I-1 to I-9 were applied with about one to two hours between coats. After the final coat, the sealed panels were allowed to cure at 25° C. for 72 hours before testing. The test results are displayed in Table I-4.

TABLE I-1

| Characteristics of AAEM Containing Precursors | | |
|---|---|---|
| AAEM Precursor | Solids (wt %) | Meq. AAEM/gram-solid |
| IA | 46.0 | 0.42 |
| IB | 46.1 | 0.00 |

Composition of Precursor IA:
1st Stage 40% of 45 BA/53.5 MMA/1 ALMA/0.5 MAA
2nd Stage 60% of 35 BA/47.5 MMA/2.5 MAA/15 AAEM
Composition of Precursor IB: Same as IA except AAEM was omitted.

TABLE I-2

| | Formulations of Silicone Modified Lattices (Quantities in parts by weight) | | | | | | | | |
|---|---|---|---|---|---|---|---|---|---|
| Composition (In order of addition) | I1 | I2 | I3 | I4 | I5 | I6 | I7 | I8 | I9 |
| Material | | | | | | | | | |
| Precursor IA | 100 | 100 | 100 | 100 | 100 | 100 | 100 | | |
| Precursor IB | | | | | | | | 100 | 100 |
| Triton X405[1] | 3.4 | 3.4 | 3.4 | 3.4 | 3.4 | 3.4 | 3.4 | 3.4 | 3.4 |
| A0700[2] | 0.0 | 1.5 | 2.9 | 4.3 | 5.8 | | | 4.3 | 0.0 |
| A0800[3] | | | | | | 3.5 | 1.2 | | |
| Meq. Silane/ Meq. AAEM | 0.00 | 0.33 | 0.66 | 1.00 | 1.33 | 0.33 | 1.00 | 1.00 | 0.00 |

Footnotes:
[1] 70% concentration
[2] Aminoethyl aminopropyl trimethoxysilane
[3] Aminopropyl Trimethoxysilane

TABLE I-3

| Aqueous Wood Sealer Formulations for Latex Compositions I1 to I9 | |
|---|---|
| Material | Amount (parts by weight) |
| General Formulation (25% Solids, Order of addition shown) | |
| Silane modified Latex | 25 pph[1] (solids) |
| DE[2] | 35% on latex solids |
| FC-120[3] | 1.2 pph |
| SWS-211[4] | 0.02 pph |
| Water | Dilute to 25% Solids |
| Specific Example of Aqueous Wood Sealer Based on Composition I-4 | |
| Latex Composition I4 | 53.87 |
| DE | 8.14 |
| FC-120 | 1.2 |
| SWS-211 | 0.02 |
| Water | 40.60 |

Footnotes:
[1] pph = parts per hundred parts of sealer.
[2] Diethylene glycol mono ethyl ether.
[3] Fluorad 120 wetting aid at 1% active in water/dipropylene glycol methyl ether: 47/1.
[4] Silicone defoamer from Wacker.

TABLE 1-4

| Properties of Aqueous Wood Sealers Based on Composition 1 to 9 | | | |
|---|---|---|---|
| Latex Composition | Mar Resistance | % Black Heel marks | Black Heel Mark Removal (dry cloth) |
| I1 | 5 | 2.3 | none |
| I2 | 2 | 1.5 | partial |
| I3 | 1 | 1.1 | complete |
| I4 | 1 | 1.6 | complete |
| I5 | 1 | 1.5 | complete |
| I6 | 4 | 1.5 | none |
| I7 | 4 | 2.0 | partial |
| I8 | 5 | 2.6 | none |
| I9 | 5 | 2.9 | none |

EXAMPLE II

Example II shows the enhancement of coating performance aminosilane modification brings to the precursor AAEM containing latex. We also show the effect of aminosilane level and aminosilane type on coating performance.

Preparation of Precursor Latex

A monomer emulsion (ME) was prepared by adding 475 g DIW, 20 g of sodium lauryl sulphate (SLS), 600 g ethyl acrylate, 335 g MMA, 15 g MAA and 50 g AAEM followed by stirring.

To a polymerization vessel, under nitrogen, 800 g DIW and 25 g SLS was added. After the temperature was increased to 85° C., 4.2 g of ammonium persulfate (ASP) in DIW was added. After the addition of the APS, add ME along with a feed of 2.1 APS in DIW at approximately 12.5 g/minute and 0.88 cc/minute respectively was initiated. After the addition of the ME was completed, the emulsion jar was rinsed with 30 g of DIW. The vessel was cooled to 56° C. over a 1 hour period after which 1 g of t-BHP in DIW and 0.5 g isoascorbic acid in DIW was added. The vessel was cooled to room temperature and filtered before modification with aminosilanes. Table II displays some characteristics of precursor IIA.

Preparation of Silicon-Modified Latex

The procedure for the preparation of a silicone-modified latex based on precursor II-A was the same as described in Example I, except the materials and proportions used are shown in Table II-2. The silane-modified latex was allowed to stand for 4 days before it is formulated into a sealer.

Preparation of Aqueous Wood Sealers Based on Silane-Modified Lattices

Table II-3 gives the sealer formulation used to evaluate compositions II-1 through II-4. A general formulation is shown as well as a specific example based on composition II-4. To a mixing vessel, all materials except the latex were added. With stirring, the silane-modified latex was added. The mixture was stirred for at least an additional hour and allowed to stand for at least 16 hours before use.

Testing of Sealers Based on Compositions II-1 to II-4

To maple wood panels, 3 coats of sealers based on compositions II-1 to II-4 were applied with about one to two hours between coats. After the final coat, the sealed panels were allowed to cure at 25° C. for 72 hours before testing. The test results are displayed in Table II-4.

TABLE II-1
Characteristics of AAEM Containing Precursor IIA

| Solids (wt %) | Meq. AAEM/gram-solid |
|---|---|
| 40.1 | 0.23 |

Composition of precursor IIA:
60 EA/33.5 MMA/1.5 MAA/5 AAEM

TABLE II-2
Formulations of Silicone-Modified Lattices
(Quantities in parts by weight)

| Composition (In order of addition) | II1 | II2 | II3 | II4 |
|---|---|---|---|---|
| Material | | | | |
| Precursor IIA | 100 | 100 | 100 | 100 |
| Triton X405[1] | 2.9 | 2.9 | 2.9 | 2.9 |
| A0700[2] | 0.0 | 0.7 | 2.1 | |
| A0699[3] | | | | 1.9 |
| Meq. Silane/ Meq. AAEM | 0.00 | 0.33 | 1.00 | 1.00 |

Footnotes:
[1] 70% concentration
[2] Aminoethyl aminopropyl trimethoxysilane
[3] Aminoethyl aminopropyl methyl dimethoxysilane

TABLE II-3
Aqueous Wood Sealer
Formulations for Latex Compositions II-1 to II-4

| Material | Amount (parts by weight) |
|---|---|
| General Formulation (25% Solids, Order of Addition Shown) | |
| Silane-Modified Latex | 25 pph[1] (solids) |
| DE[2] | 35% on latex solids |
| FC-120[3] | 1.2 pph |
| SWS-211[4] | 0.02 pph |
| Water | Dilute to 25% Solids |
| Specific Example of Aqueous Wood Sealer Based on Composition II-4 | |
| Latex Composition II-4 | 64.18 |
| DE | 9.98 |
| FC-170C | 0.20 |
| SWS-211 | 0.02 |
| Water | 25.63 |

Footnotes:
[1] pph = parts per hundred parts of sealer.
[2] Diethylene glycol mono ethyl ether.
[3] 3M Fluorad 170C wetting aid.
[4] Silicone defoamer from Wacker.

TABLE II-4
Properties of Aqueous Wood Sealers Based on Composition II-1 to II-4

| Latex Composition | Black Heel (Relative[1]) | % Scuffing |
|---|---|---|
| II1 | 3 | 3.3 |
| II2 | 2 | 1.6 |
| II3 | 2 | 0.0 |
| II4 | 1 | 0.0 |

Footnotes:
[1] 1 = best at about 2.5% coverage. Increasing number implies decreasing performance.

EXAMPLE III

Example III shows that coating performance is effected by the structure of the aminosilane.

Preparation of Precursor Latex

Precursor latex, IA, described above in Example I, was used.

Preparation of Silicone-Modified Latex

The procedure for the preparation of a silicone-modified latex based on precursor IA was the same as described above in Example I, except the materials and proportions used are shown in Table III-1 and a common preblend of precursor/Triton 405 (70%) was used. The silane-modified lattices were allowed to stand for 1 day before they were formulated into sealers.

Preparation of Aqueous Wood Sealers Based on Silane-Modified Lattices

Table III-2 gives the sealer formulation used to evaluate compositions III-1 through III-4. A general formulation is shown as well as a specific example based on composition III-1. Coating preparation is described in Example I.

Testing of Sealers Based on Compositions II-1 to II-4

To maple wood panels, 4 coats of sealers based on compositions III-1 to III-5 were applied with about one to two hours between coats. After the final coat, the sealed panels were allowed to cure at 25° C. for 4 days before testing. The test results are displayed in Table III-3.

TABLE III-1
Formulations of Silicone-Modified Lattices
(Quantities in parts by weight)

Preblend = 100 Precursor latex IA
3.3 Triton X405 (70%)

| Composition (In order of addition) | III1 | III2 | III3 | III4 | III5 |
|---|---|---|---|---|---|
| Material | | | | | |
| Preblend | | 103.3 | 103.3 | 103.3 | 103.3 |
| Precursor IA | 100 | | | | |
| Triton X405[1] | 3.3 | | | | |
| A0700[2] | | 3.4 | | | |
| A0699[3] | | | 3.2 | | |
| A0800[4] | | | | 2.8 | |
| A0742[5] | | | | | 2.9 |
| Meq. Silane/ Meq. AAEM | 0.00 | 0.80 | 0.80 | 0.80 | 0.80 |

Footnotes:
[1] 70% concentration
[2] Aminoethyl aminopropyl trimethoxysilane
[3] Aminoethyl aminopropyl methyl dimethoxysilane
[4] Aminopropyl trimethoxysilane
[5] Aminopropyl methyl diethoxysilane

TABLE III-2
Aqueous Wood Sealer
Formulations for Latex Compositions III-1 to III-5

| Material | Amount (parts by weight) |
|---|---|
| General Formulation (25% Solids, Order of Addition Shown) | |
| Silane-modified Latex | 25 pph[1] (solids) |
| DE[2] | 35% on latex solids |
| FC-120[3] | 1.2 pph |
| SWS-211[4] | 0.02 pph |
| Water | Dilute to 25% Solids |
| Specific Example of Aqueous Wood Sealer Based on Composition III-2 | |
| Latex Composition III-2 | 54.19 |
| DE | 8.14 |
| FC-120 | 1.2 |
| SWS-211 | 0.02 |
| Water | 36.30 |

Footnotes:
[1] pph = parts per hundred parts of sealer.
[2] Diethylene glycol mono ethyl ether.
[3] Fluorad 120 wetting aid at 1% active in water/dipropylene glycol methyl ether: 47/1.
[4] Silicone defoamer from Wacker.

TABLE III-3

Properties of Aqueous Wood Sealers Based on Composition III-1 to III-5

| Latex Composition | % Black Heel Marks | % Scuffing | Mar Resistance |
|---|---|---|---|
| III-1 | 3.8 | 2.2 | 5 (Poor) |
| III-2 | 2.2 | 0.0 | 1 (Exc.) |
| III-3 | 1.0 | 0.0 | 1 (Exc.) |
| III-4 | 1.7 | 1.0 | 4 (Fair) |
| III-5 | 1.2 | 0.0 | 1 (Exc.) |

EXAMPLE IV

Example IV shows that silicone modification improves the performance of a coating based on a room temperature film-forming precursor latex.

Preparation of Precursor Latex IV

The preparation and characteristics of the precursor latex, IVA, is described above in Example I, except the ratio of BA/MMA in ME-I (Monomer Emulsion I) was changed from 35/47.5 to 69.8/12.7, giving a softer, lower glass transition temperature, first stage. The solids of precursor IVA was 45.3.

Preparation of Silicone-Modified Latex

The procedure for the preparation of a silicone-modified latex based on precursor IVA was the same as described above in Example I, except the materials and proportions used are shown in Table IV-1.

Preparation of Aqueous Wood Sealers Based on Silane-Modified Lattices

Table IV-2 gives the sealer formulation used to evaluate composition IV-1. The procedure is the same as previous examples. Note no cosolvent (DE) was used as both composition IV1 and precursor IVA form films below room temperature.

Testing of Sealers based on Compositions IV-1 and Precursor IV

To maple wood panels, 4 coats of sealers based on compositions IV1 and precursor IVA were applied with about one to two hours between coats. After the final coat, the sealed panels were allowed to cure at 25° C. for 3 days before testing. The test results are displayed in Table IV-3.

TABLE IV-1

Preparation of Silicone-Modified Latex IV1 (Quantities in parts by weight) (In order of addition)

| Material | |
|---|---|
| Precursor IVA | 100.0 |
| Triton X405[1] | 3.2 |
| A0700[2] | 4.3 |
| Meq. Silane/Meq. AAEM | 1.00 |

Footnotes:
[1] 70% concentration
[2] Aminoethyl aminopropyl trimethoxysilane

TABLE IV-2

Aqueous Wood Sealer formulations for Composition IV1 (25% Solids, Order of Addition Shown)

| Material | Amount (parts by weight) | |
|---|---|---|
| Water | 45.65 | 39.85 |
| FC-120 | 0.93 | 0.93 |
| SWS-211 | 0.02 | 0.02 |
| Composition IV1 | 50.00 | |
| Precursor IVA | | 50.00 |

TABLE IV-3

Properties of Aqueous Wood Sealers Based on Composition IV1

| Latex Composition | % Black Heel Marks | % Scuffing | Mar Resistance |
|---|---|---|---|
| IV1 | 2.0 | 0 | 1 (exc) |
| Precursor IV | 3.5 | 2.2 | 5 (poor) |

EXAMPLE V

Floor Wear Test

In this example, composition III-5 was prepared and formulated as described in Example III. The control (precursor not modified with aminosilane) was composition III-1 of Example III, except X405 was omitted and formulated into a sealer according to Example III. Five coats of each coating were applied to maple panels and cured at 25° C. for one week prior to placement on the floor of the exposure area.

Table V-1 shows the effects of 26 days of wear.

TABLE V-1

Comparison of Silane-Modified and Unmodified Precursor I-1 in a Wear Test

| Latex Composition | % Gloss Retained at 20° | % Gloss Retained at 60° | Appearance |
|---|---|---|---|
| Precursor I-1 (unmodified) | 62 | 72 | Highly scuffed and scratched |
| III-5 | 91 | 82 | Few minor scuffs and scratches |

Footnotes:
[1] Gloss retained = (final gloss/initial gloss) × 100

EXAMPLE VI

In Example VI, we show neutralization with potassium hydroxide rather than ammonia.

Preparation of Precursor Lattices

The preparation and characteristics of precursor lattices VI-A and VI-B are described above in Example I, except neither latex was neutralized with NH3 and VI-B was prepared by a homogeneous process where all monomers were introduced from a single monomer emulsion. The solids of precursor VI-A and VI-B were 47.6% and 47.8% respectively.

Preparation of Silicon-Modified Latex

The procedure for the preparation of silicone-modified lattices based on precursors VI-A and VI-B is described in Example I, except the materials and proportions used are shown in Table VI-1. Also, the pH of the precursor lattices was increased to about 7.5 with aqueous potassium hydroxide before the addition of the other materials.

Preparation of Aqueous Wood Sealers Based on Silane-Modified Lattices

Table VI-2 gives the sealer formulation used to evaluate compositions VI-1 to VI-5. The procedure was the same as previous examples.

Testing of Sealers Based on Compositions IV-1 and Precursor IV

To maple wood panels, 4 coats of sealers based on compositions IV1 and precursor IV were applied with about one to two hours between coats. After the final coat, the sealed panels were allowed to cure at 25° C. for 3 days before testing. The test results are displayed in Table VI-3.

TABLE VI-1

Formulations of Silicone-Modified Lattices
(Quantities in parts by weight)

| Composition (In order of addition) | VI1 | VI2 | VI3 | VI4 | VI5 |
|---|---|---|---|---|---|
| Material | | | | | |
| Precursor VI-A | 100 | 100 | | | |
| Precursor VI-B | | | 100 | 100 | 100 |
| KOH (2.1 N) | 1.70 | 1.70 | 1.50 | 1.50 | 1.50 |
| Water | 5.08 | 11.36 | 5.52 | 11.20 | 11.72 |
| Triton X405[1] | | | 3.40 | 3.4 | 3.4 |
| A0700[2] | | | | | 3.6 |
| A0742[3] | | 3.06 | | 3.1 | |
| Meq. Silane/ Meq. AAEM | 0.00 | 0.80 | 0.00 | 0.80 | 0.80 |

Footnotes:
[1] 70% concentration
[2] Aminoethyl aminopropyl trimethoxysilane
[3] Aminoethyl aminopropyl methyl dimethoxysilane

TABLE VI-2

| Material | Amount (parts by weight) |
|---|---|
| General Formulation (25% Solids, Order of Addition Shown) | |
| Silane-modified Latex | 25 pph[1] (solids) |
| DE[2] | 35% on latex solids |
| FC-120[3] | 1.2 pph |
| SWS-211[4] | 0.02 pph |
| Water | Dilute to 25% Solids |
| Specific Example of Aqueous Wood Sealer Based on Composition VI-2 | |
| Latex Composition VI-1 | 35.00 |
| DE | 3.80 |
| FC-120 | 0.94 |
| SWS-211 | 0.02 |
| Water | 22.70 |

Footnotes:
[1] pph = parts per hundred parts of sealer.
[2] Diethylene glycol mono ethyl ether.
[3] Fluorad 120 wetting aid at 1% active in water/dipropylene glycol methyl ether: 47/1.
[4] Silicone defoamer from Wacker.

TABLE VI-3

Properties of Aqueous Wood Sealers Based on Composition IV1

| Latex Composition | % Black Heel | % Scuffing | Mar |
|---|---|---|---|
| VI1 | 2.4 | 2.5 | 5 (poor) |
| VI2 | 1.6 | <0.1% | 1 (exc) |
| VI3 | 1.6 | 1.7 | 5 (poor) |
| VI4 | 1.3 | <0.1% | 1 (exc) |
| VI5 | 1.5 | 0.0 | 1 (exc) |

EXAMPLE VII

Effect of Neutralization and Process

Example VII shows the silicon-modified latex can be prepared by adding a preblend of aminosilane and surfactant to the precursor rather than added individually. This gives an improved mode for preparation since the addition of diluted materials are less likely to "shock" the latex and cause latex flocculated. We also show neutralization by potassium hydroxide can be eliminated.

Preparation of Precursor Lattices

The latex, precursor VIIA, described in Example I, was prepared without $NH_3$ neutralization. The solids level was 46.5%.

Preparation of Silicon-Modified Latex

The silicon-modified lattices were prepared as described in Example VI, except a preblend of the aminosilane, surfactant and water was used in two of the compositions (see Table VII-1).

Preparation of Aqueous Wood Sealers Based on Silane-Modified Lattices

Aqueous sealers, based on precursors VII1 to VII4, were prepared as described in Example VI, except adjustments were made for precursor solids. The sealers were applied to wood panels and cured as described in the previous examples. The test results are displayed in Table VI-3.

TABLE VII-1

Formulations of Silicone-Modified Lattices
(Quantities in parts by weight)

| Composition (In order of addition) | VII1 | VII2 | VII3 | VII4 |
|---|---|---|---|---|
| Material | | | | |
| Precursor VII-A | 100.00 | 100.00 | 100.00 | 100.00 |
| KOH (2.1 N) | 0.70 | 0.60 | | 0.60 |
| Premix[1] | | 8.1 | 8.4 | |
| Water | | | | 1.76 |
| Triton X405[2] | | | | 3.20 |
| A0742[3] | | | | 2.97 |
| Meq. Silane/ Meq. AAEM | 0.00 | 0.80 | 0.83 | 0.80 |

Footnotes:
[1] Premix = 36.9 A0742/41.2 X405/21.8 water. After preparation, the premix was immediately added to the precursor as shown.
[2] 70% concentration
[3] Aminoethyl aminopropyl methyl dimethoxysilane

TABLE VII-2

Properties of Aqueous Wood Sealers Based on Composition IV1

| Latex Composition | Flocculate (Sedimentation) | % Black Heel | Mar |
|---|---|---|---|
| VII1 | None | 1.4 | 5 (poor) |
| VII2 | None | 1.0 | 1 (exc) |
| VII3 | None | 0.90 | 1 (exc) |
| VII4 | Slight | 1.0 | 1 (exc) |

Example VIII

Example VIII shows the importance of the surfactant for optimum sealer performance.

Preparation of Precursor Latex

To a polymerization vessel, 812.5 g of DIW was heated to 85° C., after which 20.4 g of SIPONATE DS-4 was added under a nitrogen atmosphere. In a separate vessel, a monomer emulsion (ME) was prepared by mixing 12 g of DS-4, 150 g DIW, 110 g BA, 355 MMA and 10 g MAA. To the polymerization vessel, 31 g of the ME and 10 g of DIW followed by 1.5 g ammonium persulphate (APS) in water and 1.5 g of sodium carbonate in water was added. To the ME vessel, 25 g of ALMA was added. The ME was then added to the polymerization vessel over a 90 minute period along with a cofeed of 1.5 g APS in 150 g of DIW at a rate of 0.84 g/min. After the addition of ME was complete, the APSDIW feed was terminated. The polymerization vessel was then held for an additional 30 minutes at 85° C.

A second ME was prepared as above but used 12 g DS-4, 150 g DIW, 212.5 ethyl hexyl acrylate, 67.5 styrene, 125 g acrylonitrile, 75 g AAEM and 20 g MAA. This ME was added to the polymerization vessel over a 90 minute period along with the resumption of the APS/DIW cofeed. After the addition of the ME was complete, the emulsion vessel was rinsed with 25 g DIW. The polymerization vessel was held for an additional 30 minutes at 85° C., after which it was cooled to 60° C. and chased in a similar manner as described in Example I.

Preparation of Silicon-Modified Latex

Precursor VIII-A, described in Example I, was prepared without $NH_3$ neutralization at a solids level of 45.9%. The preparation of Precursor VIIIB is described in Attachment VIII and has the following characteristics.

Composition:
1st Stage: 50% of 22 BA/71 MMA/5 ALMA/2 MAA
2nd Stage: 50% of 42.5 EHA/13.5 STY/25 AN/15 AAEM
Solids: 39.7%

Preparation of Aqueous Wood Sealers Based on Silane-Modified Lattices

Aqueous sealers, based on precursors VIII1 to VIII6, were prepared according to Table VIII-2. The sealers were applied to wood panels and cured as described in the previous examples. The test results are displayed in Table VIII-3.

TABLE VIII-I

Formulations of Silicone-Modified Lattices
(Quantities in parts by weight)

| Composition (In order of addition) | VIII1 | VIII2 | VIII3 | VIII4 | VIII5 | VIII6 |
|---|---|---|---|---|---|---|
| Material | | | | | | |
| Precursor VIIIA | 100.00 | 100.00 | 100.00 | | | |
| Precursor VIIIB | | | | 100.00 | 100.00 | 100.00[1] |
| Premix[2] | 5.67 | 6.82 | 7.96 | 3.44 | 2.45 | 0.0 |
| Characteristics | | | | | | |
| X405 Level[3] | 0.0 | 2.5% | 5.0% | 5.0% | 0.0 | 0.0 |
| Meq. Silane/ Meq. AAEM | 0.80 | 0.80 | 0.80 | 0.80 | 0.80 | 0.0 |

Footnotes:
1. Neutralized with $NH_3$ (aq.) to pH = 7.5.
2. Premixes were prepared as follows:
Composition 1: 3.56 water + 3.85 A0742.
Composition 2: 3.92 water + 2.41 X405 (70%) + 4.32 A0742
Composition 3: 4.38 water + 8.23 X405 (70%) + 7.39 A0742
Composition 4: 1.27 water + 2.38 X405 (70%) + 2.14 A0742
Composition 5: 1.98 water + 2.14 A0742
3. Percent on precursor solids.

TABLE VIII-2

Aqueous Sealer Formulations for Compositions VIII
(30% Solids)

| Material (in order of addition) | | | | | | |
|---|---|---|---|---|---|---|
| Water | 23.09 | 24.09 | 25.04 | 15.88 | 13.50 | 11.89 |
| DE | 7.05 | 6.89 | 6.73 | 6.73 | 7.05 | 7.50 |
| FC120 (1%) | 1.50 | 1.50 | 1.50 | 1.50 | 1.50 | 1.50 |
| KP-140[1] | 1.41 | 1.38 | 1.35 | 1.35 | 1.41 | 1.50 |
| EG[2] | 2.00 | 2.00 | 2.00 | 2.00 | 2.00 | 2.00 |
| Defoamer[3] | 0.02 | 0.02 | 0.02 | 0.04 | 0.04 | 0.04 |
| Charge the above into mixing vessel. With stirring add the following: | | | | | | |
| VIII1 | 64.91 | | | | | |
| VIII2 | | 64.10 | | | | |
| VIII3 | | | 63.34 | | | |
| VIII4 | | | | 72.50 | | |
| VIII5 | | | | | 74.50 | |
| VIII6 | | | | | | 75.57 |

Footnotes:
1. Tributoxy ethyl phosphate
2. Ethylene glycol
3. Silicone defoamer

TABLE VIII-3

Performance of Aqueous Sealers Based on Compositions VIII

| Latex Composition | Mar Resistance | % Black Heel Marks |
|---|---|---|
| VIII-1 | 5 (poor) | 0.8 |
| VIII-2 | 3 (good) | 1.1 |
| VIII-3 | 1 (exc) | 1.2 |
| VIII-4 | 1 (exc) | 0.9 |
| VIII-5 | 5 (poor) | 0.5 |
| VIII-6 | 5 (poor) | 1.2 |

EXAMPLE IX

Example IX shows that the surfactant does not have to be present for optimum performance of the silicone-modified latex.

Preparation of Silicon-Modified Latex

The precursor described in Example VI was used to prepare silicon-modified latex compositions IX-1 to IX-4 (see Table IX). Composition IX3 was prepared by post-addition of X405 to a portion of IX1, which was 24 hours old.

Preparation of Aqueous Wood Sealers Based on Silane-Modified Lattices

Aqueous sealers, based on precursors IX1 to IX4, were prepared according to Table VIII-2. The sealers were applied to wood panels and cured as described in the previous examples.

Properties of Aqueous Sealers Based on Compositions IX

Testing of the sealers was the same as in Examples I through VIII with the exceptions that the Snell capsule used was smaller, the heels in the capsule were larger and the time of exposure of the panels was 10 minutes rather than 5 minutes. This gave testing conditions more rigorous than in the previous examples. The results are shown in Table IX-3.

TABLE IX-1

Formulations of Silicone Modified-Lattices (Quantities in parts by weight)

| Composition (In order of addition) | IX1 | IX2 | IX3[1] | IX4[2] |
|---|---|---|---|---|
| Material | | | | |
| Precursor | 100.00 | 100.00 | 100.00 | 100.00 |
| Premix[3] | 5.67 | 7.96 | 5.67 | |
| X405 (70%) | | 3.35 | | |
| Characteristics | | | | |
| X405 Level[4] | 0.0 | 5.0% | 5.0% | 0.0 |
| Meq. Silane/ Meq. AAEM | 0.80 | 0.80 | 0.80 | 0.0 |

Footnotes:
1. Prepared by blending X405 (70%) into 24 hour old composition IX1 at a ratio of 100 parts Composition IX1 to 3.1 parts X405 (70%).
2. Neutralized with NH3 (aq.) to pH = 8.1.
3. Premixes were prepared as follows:
Composition 1: 3.56 water + 3.85 A0742.
Composition 2: 4.38 water + 8.23 X405 (70%) + 7.39 A0742 Composition 4: 3.56 water + 3.85 A0742
4. Percent on precursor solids.

TABLE IX-2

Aqueous Sealer Formulations for Compositions IX (30% Solids)

| Material (in order of addition) | | | | |
|---|---|---|---|---|
| Water | 20.84 | 22.77 | 22.17 | 19.94 |
| DE | 7.05 | 6.73 | 6.73 | 7.50 |
| FC120 (1%) | 1.50 | 1.50 | 1.50 | 1.50 |
| KP-140[1] | 1.40 | 1.40 | 1.40 | 1.40 |
| EG[2] | 2.00 | 2.00 | 2.00 | 2.00 |
| Defoamer[3] | 0.20 | 0.20 | 0.20 | 0.20 |
| Charge the above into mixing vessel. | | | | |
| With stirring add the following: | | | | |
| IX-1 | 64.91 | | | |
| IX-2 | | 63.30 | | |
| IX-3 | | | 63.91 | |
| IX-4 | | | | 65.36 |
| After 30 min. of stirring add the following: | | | | |
| Acrysol RM-1020[4] | 2.1 | 2.1 | 2.1 | 2.1 |

Footnotes:
1. Tributoxy ethyl phosphate
2. Ethylene glycol
3. Foamaster 111
4. Rheology modifier

TABLE IX-3

Performance of Aqueous Sealers Based on Compositions IX

| Latex Composition | Mar Resistance[1] | % Black Heel Marks | % Scuff Marks |
|---|---|---|---|
| IX-1 | 3-4 (fair) | 1.4 | 1.2 |
| IX-2 | 2 (very good) | 1.1 | 0.9 |
| IX-3 | 1 (exc) | 1.0 | 0.7 |
| IX-4 | 5 (poor) | 2.8 | 1.8 |

Footnotes:
1. After 3 week cure at 25° C.

EXAMPLE X

Example X shows the hydrophilic/lipophilic balance (HBL) of the surfactant can effect the performance of the silicon modified latex.

Preparation of Silicon-Modified Latex

The precursor described in Example VI was used to prepare silicon-modified latex compositions X-1 to X-3. The milliequivalents of surfactant to precursor solids was held constant at 0.25. As described above in Example IX, a premix of surfactant, aminosilane and water was added to the precursor with stirring (see Table X-1).

Preparation of Aqueous Wood Sealers Based on Silane-Modified Lattices

Aqueous sealers, based on precursors IX1 to IX4, were prepared according to Table X-2. The sealers were applied to wood panels and cured as described in the previous examples.

Properties of Aqueous Sealers Based on Compositions IX

Testing of the sealers was the same as in Examples I through VIII with the exceptions that the Snell capsule used was smaller, the heels in the capsule were larger. The time in the Snell capsule was 5 minutes. This gave testing conditions more rigorous than in the previous examples. The results are shown in Table X-3.

TABLE X-1

Formulations of Silicone-Modified Lattices (Quantities in parts by weight)

| Composition (In order of addition) | X1 | X2 | X3 |
|---|---|---|---|
| Material | | | |
| Precursor | 108.93 | 108.93 | 108.93 |
| Premix[1] | 10.38 | 8.70 | 6.94 |
| Characteristics | | | |
| Surfactant | X705 | X405 | X100 |
| Surfactant HBL | 13.5 | 17.9 | 18.7 |
| Meq. Silane/ Meq. AAEM | 0.80 | 0.80 | 0.80 |

Footnotes:
1. Premixes were prepared as follows:
Composition 1: 2.38 water + 11.94 Triton X705 (70%) + 6.43 A0742.
Composition 2: 3.82 water + 7.14 Triton X405 (70%) + 6.43 A0742.
Composition 3: 5.96 water + 1.49 Triton X100 (100%) + 6.43 A0742.
Note in all premixes wt. water/wt. silane = 0.93.

TABLE X-2

Aqueous Sealer Formulations for Compositions X (30% Solids)

| Material (in order of addition) | | | |
|---|---|---|---|
| Water | 23.89 | 22.72 | 21.63 |
| DE | 6.63 | 6.73 | 6.83 |
| FC120 (1%) | 1.50 | 1.50 | 1.50 |
| KP-140[1] | 1.40 | 1.40 | 1.40 |
| EG[2] | 2.00 | 2.00 | 2.00 |
| Defoamer[3] | 0.15 | 0.15 | 0.15 |
| Charge the above into mixing vessel. | | | |

TABLE X-2-continued

Aqueous Sealer Formulations for Compositions X (30% Solids)

| Material (in order of addition) | | | |
|---|---|---|---|
| With stirring add the following. | | | |
| IX-1 | 62.33 | | |
| IX-2 | | 63.30 | |
| IX-3 | | | 64.39 |
| After 30 min. of stirring add the following: | | | |
| Acrysol RM-1020[4] | 2.1 | 2.1 | 2.1 |

Footnotes:
1. Tributoxy ethyl phosphate
2. Ethylene glycol
3. Foamaster 111
4. Rheology modifier

TABLE X-3

Performance of Aqueous Sealers Based on Compositions X

| Latex Composition | Mar Resistance[1] | % Black Heel Marks | Comments |
|---|---|---|---|
| X-1 | 1 (exc) | 0.80 | Hazy film |
| X-2 | 1 (exc) | 1.2 | |
| X-3 | 4 (fair) | 1.4 | |

EXAMPLE XI

Floor Wear Test

In Example XI, the aminosilane-modified composition X-2 of Example X is compared to a commercially available solvent dispersed, oil-modified urethane (OMU). The coating formulation for composition X-2 is given in Table X2.

To maple panels, 3 coats of the commercially available OMU, (Hillyard Chemical Company,: St. Joseph, Mo.), was applied. To another maple panel, 2 coats of a clear waterborne primer was applied, followed by 2 coats of the coating based on composition X-2. Both panels were cured for 72 hours at 25° C. before placement in the floor test area.

Table XI-I compares the gloss at 20° and 60° as a function of exposure time. The aminosilane-modified polymer exhibits gloss retention superior to the single pack solvent dispersed OMU.

TABLE XI-I

| 60°/20° gloss: | Initial | After 11 day exposure | After one month Exposure |
|---|---|---|---|
| Comp X-2 | 63/27 | 66/27 | 64/24 |
| OMU | 73/29 | 63/16 | 67/15 |

We claim:
1. A process comprising:
   1) admixing:
      a) at least one aqueous-based acetoacetate-functional polymer; and
      b) at least one amino-functional silane; and
   2) applying the aqueous-based admixture to a substrate.

2. The process of claim 1 wherein admixing of aqueous-based acetoacetate-functional polymer and amino-functional silane is conducted in the presence of a surfactant selected from the group consisting of octylphenoxypolyethoxyethanols, nonylphenoxypolyethoxyethanols, polypropyloxyethoxy alcohols, sodium lauryl sulfate, and sodium stearate.

3. The process of claim 2 wherein the level of the surfactant is from about 0.5 weight percent to about 20 weight percent based on the weight of the aqueous-based acetoacetate-functional polymer.

4. The process of claim 3 wherein the surfactant's hydrophilic-lipophilic balance is greater than or equal to 8, preferably greater than or equal to 15.

5. The process of claim 3 wherein the surfactant is non-ionic.

6. The process of claim 5 wherein the surfactant is octylphenoxypolyethoxyethanol.

* * * * *